United States Patent [19]

Ragg

[11] Patent Number: 4,936,279
[45] Date of Patent: Jun. 26, 1990

[54] PRESSURIZING A GAS INJECTION TYPE FUEL INJECTION SYSTEM

[75] Inventor: Peter W. Ragg, Henley Beach, Australia

[73] Assignee: Orbital Engine Company Proprietary Limited, Balcatta, Australia

[21] Appl. No.: 332,841

[22] PCT Filed: Apr. 15, 1988

[86] PCT No.: PCT/AU88/00112
§ 371 Date: Feb. 14, 1989
§ 102(e) Date: Feb. 14, 1989

[87] PCT Pub. No.: WO88/08082
PCT Pub. Date: Oct. 20, 1988

[30] Foreign Application Priority Data

Apr. 15, 1987 [AU] Australia .............. PI01459

[51] Int. Cl.$^5$ ............................. F02M 67/04
[52] U.S. Cl. .................. 123/533; 123/534; 123/179 L
[58] Field of Search ........... 123/531, 532, 533, 534, 123/179 L

[56] References Cited

U.S. PATENT DOCUMENTS

| 1,551,731 | 1/1923 | Charter | 123/532 |
| 4,693,224 | 9/1987 | McKay | 123/531 |
| 4,759,335 | 6/1988 | Ragg et al. | 123/531 |
| 4,765,304 | 8/1988 | Brown | 123/532 |
| 4,771,754 | 9/1988 | Reinke | 123/532 |

FOREIGN PATENT DOCUMENTS 101791 4/1936 Australia .

Primary Examiner—Tony M. Argenbright
Assistant Examiner—Robert E. Mates
Attorney, Agent, or Firm—Armstrong, Nikaido, Marmelstein, Kubovcik & Murray

[57] ABSTRACT

A fuel injected internal combustion engine and a method of operating same, the engine having a fuel injection system wherein fuel is injected through a selectively openable injector nozzle directly into a combustion chamber of the engine by gas from a pressurized gas supply system. While the engine is being cranked during start-up of the engine, the injectory nozzle is opened to communicate said combustion chamber with the gas supply system. Gas compressed within the combustion chamber enters into the gas supply system to assist in rapidly establishing gas pressure for subsequent operation of the fuel injection system.

14 Claims, 1 Drawing Sheet

PRESSURIZING A GAS INJECTION TYPE FUEL INJECTION SYSTEM

This invention relates to fuel injection systems for internal combustion engines of the type wherein metered quantities of fuel are delivered to the engine entrained in a gas such as air.

In the past, these type of fuel injection systems have principally been used on relatively large engines, usually of the diesel or heavy oil type. However, the present applicant has developed petrol or gasoline fuel injection systems for relatively high speed engines using the principle of delivering the metered quantity of fuel to the engine by a compressed gas, such as air.

In the application of this type of fuel injection system to automotive and outboard marine engines, commercial considerations require the engine start-up period to be relatively short under a wide range of conditions. In order to achieve start-up within this time limitation, it will be appreciated that the availability of compressed gas at an adequate pressure is essential before start-up can be achieved. However, for cost and other considerations, it is not convenient to provide a relatively large compressed air storage capacity, and there is also the risk of loss of pressure due to leakage, particularly when the engine has been inoperative for a considerable period.

It is usual to provide a compressor driven by the engine as the means of providing compressed air for the injection system, and for economic and energy consumption reasons, it is customary to select the compressor capacity to closely match the air consumption rate of the engine. Thus, under start-up conditions where there is no reserve supply of air at the appropriate pressure, the compressor must complete a number of cycles before the air available for injection of the fuel is at the required pressure.

The above factors contribute to lengthening the period between commencement of the start-up sequence of the engine and the availability of air at the required pressure for injection of the fuel. Accordingly, it is the object of the present invention to reduce the period required to bring the gas used by the fuel injection system up to a pressure adequate for engine start-up.

With this object in view, there is provided in the operation of an internal combustion engine, having a fuel injection system wherein fuel is injected through a selectively openable injector nozzle directly into a combustion chamber of the engine by gas from a pressurised gas system, the step of delivering gas from the engine combustion chamber through the injector nozzle into the gas supply system in response to the existence of an engine start-up sequence.

More specifically, the selectively openable injector nozzle is opened in response to initiation of the start-up sequence for a period during one cycle or each of a number of cycles of at least one combustion chamber of the engine whereby, during that period or periods gas, being predominantly air, is delivered from the combustion chamber to the gas supply system, to increase the pressure of the gas in the gas supply system.

In a multi-cylinder engine the individual fuel injector nozzles of each cylinder may receive gas from a single gas system and accordingly the injection nozzle of only one cylinder may be required to be opened to deliver gas to the gas supply system. However, if desired, the injector nozzles of any number of the cylinders of the engine may be opened during a portion of at least one cycle of the respective cylinder. Where only one injector nozzle is opened to provide gas to the gas system, that nozzle may be opened for a portion of one or more cycles of that particular cylinder. However, where the injector nozzles of more than one cylinder are opened during respective cycles, with a carefully designed gas supply system, it should normally not be necessary to open each injector nozzle during more than one cycle of its respective cylinder.

The injector nozzle may be opened at any time in the cylinder cycle when the pressure in the cylinder is above that required by the gas supply system at start-up. The highest pressure in the cylinder exists close to the point of change in the cycle from the compression stroke to the expansion stroke. Accordingly the injector nozzle may conveniently be open for a period including the latter part of the compression stroke and the early part of the following expansion stroke.

The initiation of the start-up operation of an engine is usually in response to the activation of a manually operable switch, and the activation of this switch may be used to trigger a mechanism to effect the opening of the injector nozzle, or nozzles, at the appropriate time in the cycle of the respective cylinders. During normal operation of modern fuel injection systems, the opening and closing of the injector nozzles to effect injection of fuel is under the control of an electronic control unit (ECU), and the opening of the nozzles during start-up can similarly be under the control of the same ECU, which is programmed to respond to an input signal generated upon activation of the switch controlling starting of the engine.

Where an ECU is used to control the fuel injection system it is necessary to provide a sensor that generates an input to the ECU to indicate the speed of rotation of the engine and a reference point in the engine cycle. Accordingly the initiation of start-up of the engine may be detected by suitably programming the ECU to recognize the commencement of rotation of the engine after a stationary period, such as the commencement of cranking of the engine.

The ability to provide air from the engine cylinder or cylinders into the gas supply system, results in the gas supply system being brought to an adequate pressure for engine start-up very rapidly, as the actual quantity of air available from each cylinder of the engine during a single cycle of the cylinder is many times that quantity which would be available from one cycle of the compressor normally provided to maintain the air supply to the fuel injection system. Consequently the air supply system is brought to operating pressure more quickly. In addition, there are benefits derived from the reduction in the compression pressure developed in the cylinder whilst it is in communication with the air supply system, whereby there is a reduction in the load applied to the engine cranking mechanism, such as the conventional electric starter motor. In turn, this reduction in the load on the starter motor reduces the electrical energy required by the starter motor and can result in an increase in the cranking speed of the engine during the start-up operation.

The invention will be more readily understood from the following description of one practical arrangement of a fuel metering system for an internal combustion engine as illustrated in the accompanying drawings.

Figure 1:
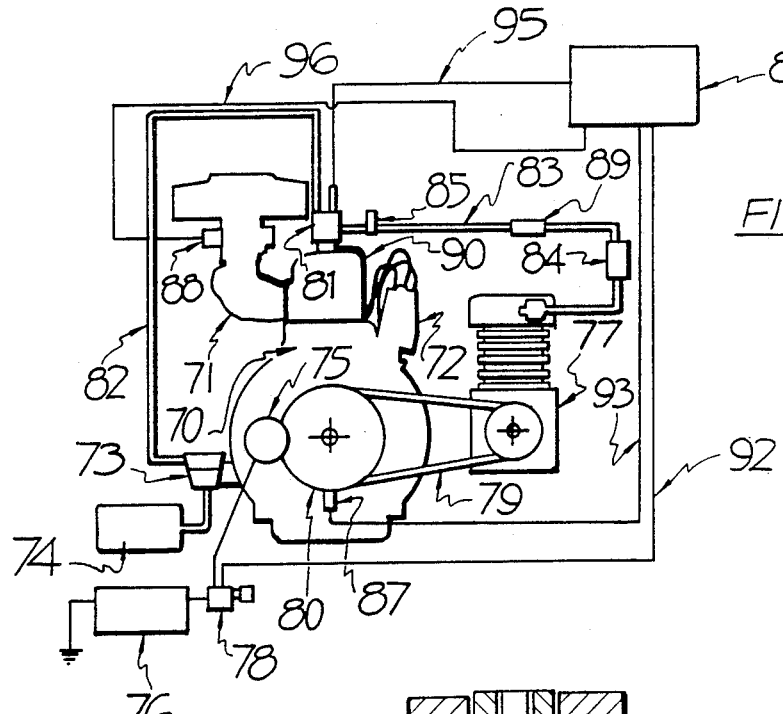
FIG. 1 is a diagramatic representation of a fuel injected engine.

Referring now to FIG. 1, the engine 70 may be of any conventional type, having an air intake system 71, an ignition system 72, a fuel pump 73, and a fuel reservoir 74. The engine further includes an electric starter motor 75, which is energised by the battery 76 upon operation of the starter switch 78. The air compressor 77 is driven by the belt 79 from the engine crankshaft pulley 80.

Mounted in the cylinder head 90 of the engine 70 is a fuel metering and injection unit 81,(one for each cylinder in a multi-cylinder engine). The metering and injection unit 81 receives fuel via the conduit 82 from the fuel pump 73 and receives air from the compressor 77 via the conduit 83. An air pressure regulator 84 is provided in the conduit 83 and the latter delivers air to the air manifold 85 to which each metering and injection unit 81 of each of the cylinders of the engine is connected to receive air. The electronic control unit (ECU) 86 receives signals from a crankshaft speed and position sensor 87 via the lead 93 and an air flow sensor 88 located in the air intake system 71 via the lead 96. The ECU 86 may also receive signals indicative of other conditions of the engine, such as the engine temperature and ambient temperature (not shown), and from all input signals determines the quantity of fuel required to be delivered to each of the cylinders of the engine, each cycle of the respective cylinder. This general type of ECU is well-known in the art of electronically controlled fuel injection systems and will not be described here in further detail.

Figure 2:
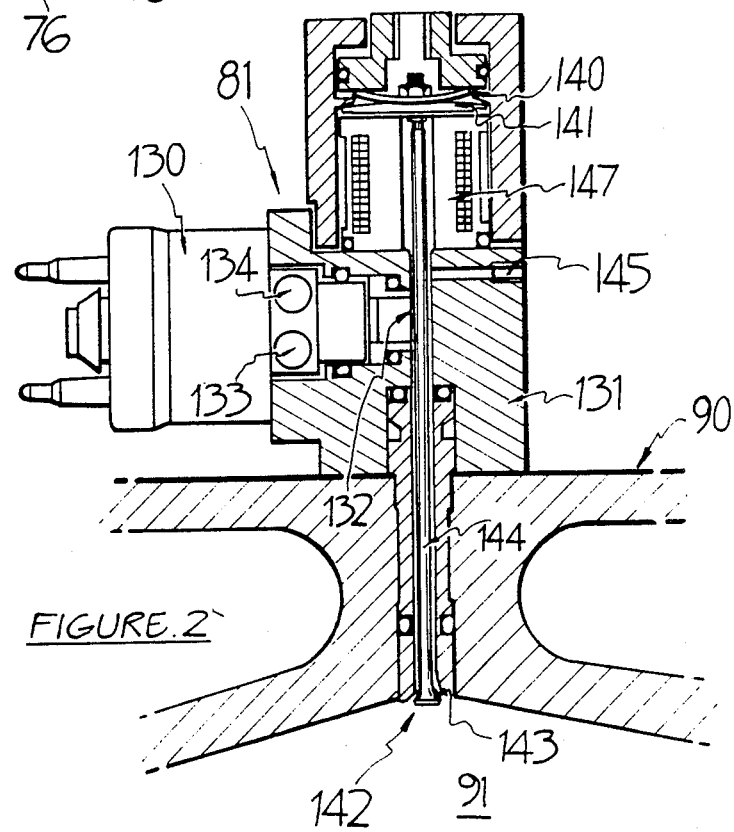
FIG. 2 is a sectional view through a typical form of metering and injector unit as used in the system shown in FIG. 1.

The fuel metering and injection unit 81 as shown in FIG. 2 incorporates a suitable fuel metering device 130, such an automotive type throttle body injector, coupled to an injector body 131 having a fuel chamber 132 therein. Fuel is delivered from the fuel pump 73 through fuel inlet port 133 to the metering device 130 which meters the amount of fuel supplied to the fuel chamber 132 in accordance with the engine fuel demand. Excess fuel supplied to the metering device is returned to a fuel reservoir via fuel return port 134. The particular construction of the fuel metering device 130 is not critical to the present invention and any suitable device may be used.

The valve 143 of the injector nozzle 142 is coupled, via a valve stem 144, which passes through the fuel chamber 132, to the armature 141 of the solenoid 147 located within the injector body 131. The valve 143 is biased into the closed position by the disc spring 140 and is opened by energising the solenoid 147. Energising of the solenoid 147 is controlled by the ECU 86 via the lead 95 in time relation to the engine cycle to effect delivery of the fuel from the fuel chamber 132 to a cylinder of the engine 70.

The fuel chamber 132 is in constant communication with the air manifold 85 via the air inlet port 145 and thus under normal operation is maintained at a substantially steady air pressure. Upon energising of the solenoid 147 the valve 143 is displaced downwardly to open the nozzle 142 so that the metered quantity of fuel held in the fuel chamber 132 is carried by air out of the fuel chamber 132 through the nozzle 142 into the combustion chamber of a cylinder of the engine.

Further details of the operation of the fuel metering and injection systems incorporating a fuel chamber such as indicated at 132 in FIG. 2 is disclosed in Australian Patent Application No. 567037 and corresponding U.S. Pat. No. 4,693,224 the disclosures of which are each incorporated herein by reference.

It will be appreciated from the above description that the nozzle 142 is located within the cylinder head 90 of the engine, and in communication with the combustion chamber 91 defined within the engine cylinder. As above described, when the nozzle 142 is opened and the air supply available via the air inlet port 145 is above the pressure in the engine cylinder, air with fuel entrained therein will flow from the air manifold 85 through the port 145, fuel chamber 132 and nozzle 142, into the engine combustion chamber. However, if the air supply in the air manifold 85, is not at a sufficiently high pressure it cannot effectively carry the fuel from the fuel chamber 132 through the nozzle 142 into the combustion chamber. Insufficient pressure to effect this operation may exist when the engine is being initially started, after there has been an adequate time lapse since previous operation of the engine to permit the pressure in the air supply system, consisting of the conduit 83 compressor 87 and air manifold 85, to fall, principally because of air leakage.

It is currently proposed to provide a signal to the ECU 86 from the starter switch 78, via the lead 92, when the starter switch is operated to energise the starter motor 75. The ECU is programmed so that, upon receipt of this signal, the ECU will not instruct the metering device 130 to deliver fuel into the chamber 132, but will energise the solenoid 147 to open the nozzle 142. This programme also times the energising of the solenoid 147 in relation to the cycle of the cylinder of the engine, as sensed by the crankshaft position sensor 87 and passed to the ECU by the lead 93, so that the solenoid 147 is energised and the nozzle 142 opened at a pre-determined point in the compression stroke of the particular cylinder of the engine.

Thus with the nozzle 142 open and the engine being cranked as part of the engine start-up sequence, the pressure in the cylinder will rise to a level sufficient to cause air to flow from the engine cylinder through the open nozzle 142 into the fuel chamber 132 and from there through the port 145 into the air manifold 85. Having regard to the displacement volume of the engine cylinder, compared with the volume of the air manifold 85, and of the air space in each of the injectors coupled thereto, the air pressure in the air manifold 85 can be brought up to an operating pressure in only one or two cycles of the particular engine cylinder.

A check valve 89 may be provided in the air passage 83 so that when the pressure in the air manifold 85 is being raised by air delivered from the engine cylinders, that air does not pass back into the compressor 77. If the high pressure air was permitted to enter the compressor it may place a high load on the compressor piston that may lead to damage and failure of the compressor.

The pressure in the engine cylinder progressively increases during the compression stroke and decreases during the expansion stroke. It will therefore be appreciated that the pressure in the cylinder is sufficient to deliver air to the air supply system during a substantial part of the compression stroke leading to the top dead centre point of the engine cycle, and during a substantial part of the expansion stroke extending from the top dead centre point. Accordingly to obtain the maximum effective use of the pressure in the cylinder the ECU should be programmed so the nozzle 142 is opened during at least the latter part of the compression stroke and the initial part of the expansion stroke of the cylinder communicating with the nozzle.

The ECU is programmed to control the number of cycles of the engine over which the nozzle 142 is opened. Practice has shown that one or two cycles of one cylinder is sufficient to bring the air manifold 85 up to the required operating pressure. A pressure sensor may be provided in the air manifold 85 to signal when the pressure in the air manifold is above that level sufficient to effectively deliver the fuel to the engine. The ECU may be programmed so that if the air pressure is adequate at the initiation of engine start-up then the start-up sequence will proceed without the procedure to deliver air to the air manifold from the engine cylinder. The pressure sensor in the air manifold may also be used to signal the ECU to terminate the supply of air to the air manifold when the pressure therein has been raised to a predetermined level.

It is common practice when operating a solenoid actuated fuel delivery valve of an injector nozzle, such as the valve 143 of the nozzle 142 as shown in FIG. 2, to provide an initial high current to the solenoid to open the nozzle and to then reduce the current for the remainder of the nozzle open period. This practice is based on the fact that the high current is required, when the armature is spaced from the coil of the solenoid, with an air gap therebetween, to create the required magnetic field strength to move the armature and the valve of the nozzle to the open position. Once the armature has effected the movement to move closer to or into engagement with the core of the solenoid coil a lower strength magnetic field is sufficient to maintain that position and hence maintain the valve of the nozzle in the open position.

It has been found desirable when the solenoid 147 is energised, to move the valve 143 to open the nozzle 142 during engine start-up to deliver gas from the engine cylinder to the air supply system, to provide a greater magnetic field strength than that normally used to hold the valve 143 in the open position during fuel injection. It is to be noted that during fuel delivery the pressure differential across the valve 143 assists the solenoid in holding the valve open while when the air supply system is receiving air from the engine cylinder the pressure differential opposes the force applied by the solenoid to hold the valve open. Accordingly during the supply of gas from the engine cylinder to the air supply system, the current provided to the solenoid, throughout the injector nozzle 142 open period, may be higher than the reduced current provided during the delivery of fuel through the injector nozzle to the engine cylinder. Conveniently the initial high current provided to open the injector nozzle is maintained for substantially the whole of the period that the injector nozzle is held open to supply gas to the air supply system.

The present invention is particularly applicable to automotive and outboard marine engines where short start-up times are important, but may also be incorporated in fuel injection systems of other engines. The invention is applicable to engines operating on either the two stroke cycle or four stroke cycle, although those operating on the two-stroke cycle are preferred.

The claims defining the invention are as follows:

1. A method of operating an internal combustion engine having a fuel injection system wherein fuel is injected through a selectively openable injector nozzle directly into a combustion chamber of the engine by gas from a pressurised gas supply system, characterised by the step of delivering gas from the engine combustion chamber through the injector nozzle into the gas supply system in response to the occurance of an engine start-up sequence.

2. A method as claimed in claim 1 wherein the selectively openable injector nozzle is opened for a predetermined period during at least one cycle of the engine to deliver gas from the combustion chamber to the gas supply system.

3. A method as claimed in claim 2 wherein the predetermined period that the selectively openable injector nozzle is open commences during the compression stroke of said engine cycle and extends into the expansion stroke of that cycle.

4. A method as claimed in claim 1, 2 or 3 wherein the engine is a multi-cylinder engine with a respective selectively openable injector nozzle for each cylinder, and characterised in that at least one of said injector nozzle is opened in response to said engine start-up sequence to permit delivery of gas to the gas supply system.

5. A method as claimed in any one of claims 1,2 or 3 characterised in that said injector nozzle is opened in response to initiation of the engine start-up sequence.

6. A fuel injected internal combustion engine having a fuel injection system wherein fuel is injected through a selectively openable injector nozzle directly into a combustion chamber of the engine by gas from a pressurised gas supply system, characterised by means operable to initiate an engine start-up sequence to establish operation of the engine, and means operable to open said injector nozzle in response to the occurance of the start-up sequence to permit gas to be supplied from the combustion chamber to the gas supply system during said start-up sequence.

7. An internal combustion engine as claimed in claim 6 wherein said means operable to open said injector nozzle is adapted to open said injector nozzle for a predetermined period during at least one cycle of the engine.

8. An internal combustion engine as claimed in claim 6 or 7 being a multi-cylinder engine with one said injector nozzle for the combustion chamber of each cylinder, characterised in that at least one said injector nozzle is opened in response to the occurance of the engine start up sequence.

9. A fuel injected internal combustion engine having a fuel injection system wherein fuel is injected through a selectively openable injector nozzle directly into a combustion chamber of the engine by gas from a pressurised gas supply system, characterised by cranking means operable to crank the engine during start-up of the engine, means to activate said cranking means, and nozzle control means operable in response to actuation of said activator means to communicate said combustion chamber with said gas supply system whereby gas is supplied from the combustion chamber to the gas supply system during cranking of the engine.

10. An internal combustion engine as claimed in claim 9 wherein said nozzle control means includes an electricly energisable means to open the injector nozzle for a selected period in response to actuation of said activator means.

11. An internal combustion engine as claimed in claim 10 wherein said selected period is in a set relation to the engine cycle.

12. An internal combustion engine as claimed in claim 11 wherein said selected period commences during the compression stroke of the engine cycle and extends into the expansion stroke of that cycle.

13. An internal combustion engine as claimed in claim 6 being a two stroke cycle engine.

14. An internal combustion engine as claimed in claim 6 being an outboard marine engine.

* * * * *